Sept. 1, 1936.                H. KÜPPENBENDER                2,053,089
                               PHOTOGRAPHIC CAMERA
                                Filed Oct. 9, 1935
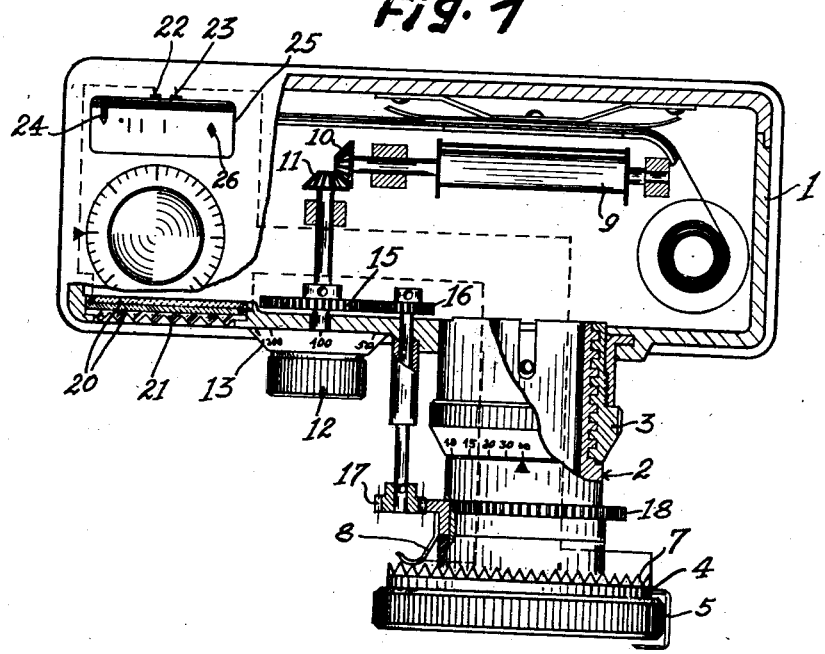
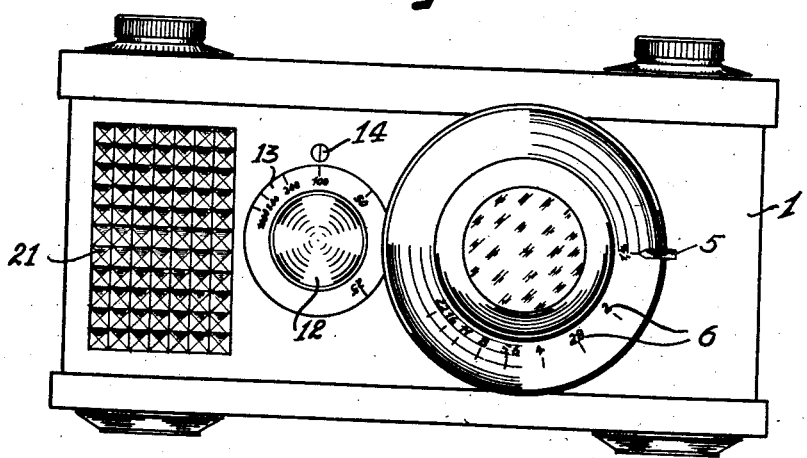
Inventor
Heinz Küppenbender
by B. Singer
Attorney Patented Sept. 1, 1936

2,053,089

UNITED STATES PATENT OFFICE 2,053,089

PHOTOGRAPHIC CAMERA

Heinz Küppenbender, Dresden, Germany

Application October 9, 1935, Serial No. 44,182
In Germany September 5, 1934

4 Claims. (Cl. 95—10)

This invention relates to improvements in photographic cameras.

The invention has particular reference to cameras having permanently associated therewith an electric photometer, the circuit of which is adjustable in accordance with other camera adjustments made. Camera adjustments of this character are the adjustment of the aperture of the diaphragm, the speed of the shutter, and the sensitiveness of the plate or film used.

It is, therefore, an object of the present invention to facilitate the adjustment of the shutter to the proper speed by bringing the shutter into a certain correlation to the electric photometer, causing an indicator of the latter to assume a predetermined position when the shutter speed has been set in accordance with the intensity of the prevailing light.

It is also an object of the invention to facilitate the adjustment of the shutter not only in accordance with the prevailing light condition, as indicated by the photometer, but also in accordance with the aperture of the diaphragm selected, since any adjustment of the diaphragm also will alter the conditions which control the position of the indicating element in the photometer.

It is also an object of the invention to provide a photometer having a photoelectric cell adapted to generate electric current with a resistance located in said current and variable in accordance with the adjustment of movable elements of the camera, as for instance with the positions of the diaphragm adjusting member or with the position of the shutter setting member or with both.

With these and other objects in view, an embodiment of the invention is illustrated in the accompanying drawing by way of example.

The specification makes reference to this drawing.

In the drawing:

Fig. 1 is a cross-sectional view and partly top plan view of a camera equipped with the electric photometer of this type, and Fig. 2 is a front elevation of this camera.

The camera comprises a casing 1 which is equipped at the front wall with a detachable mounting 2 for a lens. The focal adjustment of the lens may be secured by relative rotation of the mounting 2, the screw-threads of the bushing or sleeve 3.

Detachable mountings for lenses of this type are well known in connection with photographic cameras, and their attachment means or optical equipment are, therefore, not illustrated in the drawing. The diaphragm (not shown) may be set to selectively predetermined apertures by means of a ring or annular disc 4 having a pointer 5 which is adapted to play over an aperture dial 6 on the lens mounting. The adjusting member 4 for the diaphragm in the present embodiment also serves as a carrier for a resistance 7 in the form of a flat coil or the like having the individual resistance elements bare on one surface, so that these elements upon rotatable adjustment of the ring 4 are successively engaged by a contact member 8.

The shutter is conventionally indicated as a curtain or slit shutter 9 in operative connection with a knob 10 through bevel gears 11, 12, the knob being preferably disposed on the front wall of the camera adjacent the exchangeable lens mounting. The knob is equipped with a scale carrying member 13 adapted to move successively the speed indications on said member into apposition with a fixed mark 14 also on the front of the camera. This member 12 for setting the shutter to a predetermined speed also is connected with the slidable contact element 8 through a train of gears 15, 16, 17 and 18.

The electric photometer also permanently associated with the camera 1 in the embodiment illustrated in the drawing, comprises a plurality of flat elements 20 superposed and adapted to generate an electric current when energized by light. This assembly of photosensitive layers is preferably positioned directly to the rear of an opening in the front wall, which opening may be covered by a transparent element 21 having prismatic projections for the purpose of deflecting the rays of light uniformly against the assembly of photosensitive layers 20. The resistance 7 whose position relatively to the contact element 8 will be varied upon movement of the diaphragm setting member 4 is connected in the circuit of the current produced by this photoelectric cell or assembly 20. The same circuit also contains a current indicating instrument (not shown) having two terminals 22 and 23, and a pointer 24. An opening 25 in the top wall of the camera permits the user to observe the position of the indicator 24; the photometer also is provided with a fixed mark 26 visible through said opening 25.

In the use of the device, the detachable mounting 2 of the lens is adjusted within the screw-threaded bushing 3 to focal exactness as desired, and the diaphragm aperture is selected by rotating the member 4 until the pointer 5 is in opposition to the desired aperture indication 6 on the fixed scale. After the selection of the diaphragm aperture, the shutter setting member 12 is rotated until the observer of the instrument notices that the pointer 24 of the photoelectric meter is in opposition to the fixed mark 26 in the opening 25. This position of the pointer then indicates that the proper adjustment of the speed of the shutter has been effected with respect to the diaphragm opening previously selected.

I claim:

1. In a camera, the combination of an electric photometer, a shutter, a shutter setting member, a contact element actuated thereby, a resistance in the circuit of the electric photometer, and means for varying the position of the resistance relatively to the contact member, the contact element being in permanent variable engagement with said resistance, whereby the indications of the photometer are varied in accordance with the position of the shutter setting member and the position of said resistance.

2. In a camera, the combination of an electric photometer, a shutter, a shutter setting member, a movable diaphragm setting element, a resistance in the photometer circuit carried by said element, and a contact element actuated by the shutter setting member and in engagement with the resistance, whereby the indications of the photometer are varied in accordance with the position of the diaphragm setting element and the shutter adjusting member.

3. In a camera, the combination of an electric photometer, a resistance in the circuit of said photometer, a contact in permanent engagement with said resistance, and a pair of independent camera adjusting members connected with the resistance and with the contact respectively for altering their relation to each other and thereby also altering the resistance in the photometer circuit.

4. In a camera having a curtain shutter, the combination of a photo electric exposure meter, means for adjusting said curtain shutter and means operatively coupling said curtain shutter adjusting means with said photo electric exposure meter, said photo electric exposure meter having a fixed mark and a movable indicating member whose position is varied when said curtain shutter adjusting means is operated, whereby the correct shutter adjustment is obtained when said movable indicating member points to said fixed mark.

HEINZ KÜPPENBENDER.